(12) United States Patent
Shurtleff et al.

(10) Patent No.: US 11,228,485 B2
(45) Date of Patent: Jan. 18, 2022

(54) DYNAMIC ACTION DASHLET FOR REAL-TIME SYSTEMS OPERATION MANAGEMENT

(71) Applicant: Cisco Technology, Inc., San Jose, CA (US)

(72) Inventors: Mark Stephan Shurtleff, Hayward, CA (US); Jerome Henry, Pittsboro, NC (US); Bart Brinckman, Nevele (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 278 days.

(21) Appl. No.: 16/354,045

(22) Filed: Mar. 14, 2019

(65) Prior Publication Data

US 2020/0295994 A1 Sep. 17, 2020

(51) Int. Cl.
*H04L 12/24* (2006.01)
*H04L 12/26* (2006.01)
*H04L 29/08* (2006.01)

(52) U.S. Cl.
CPC .......... *H04L 41/0816* (2013.01); *H04L 41/06* (2013.01); *H04L 41/0823* (2013.01); *H04L 41/0853* (2013.01); *H04L 41/0879* (2013.01); *H04L 41/0896* (2013.01); *H04L 41/22* (2013.01); *H04L 43/0811* (2013.01); *H04L 67/12* (2013.01)

(58) Field of Classification Search
None
See application file for complete search history.

(56) References Cited

U.S. PATENT DOCUMENTS

| 9,641,544 | B1* | 5/2017 | Treat | H04L 63/02 |
|---|---|---|---|---|
| 9,813,435 | B2 | 11/2017 | Muddu et al. | |
| 9,930,064 | B1* | 3/2018 | Sherwell | G06F 21/52 |
| 2007/0089163 | A1* | 4/2007 | Denton | H04L 63/0823 |
| | | | | 726/2 |
| 2012/0239541 | A1* | 9/2012 | Tsukahara | G06Q 40/02 |
| | | | | 705/35 |
| 2014/0108943 | A1* | 4/2014 | Lee | H04W 4/18 |
| | | | | 715/738 |

(Continued)

OTHER PUBLICATIONS

"LAN Monitoring with Network Performance Monitor," Solar Winds, www.solarwinds.com, accessed on Sep. 18, 2018, pp. 1-7.

(Continued)

*Primary Examiner* — Mohamed Ibrahim
(74) *Attorney, Agent, or Firm* — Polsinelli PC (57) ABSTRACT

The present technology provides a system and method for automating on-boarding and management of IoT devices on data network. The disclosed technology further provides an interactive representation of various performance attribute with automatically generated actionable alert based on operator defined rules and performance-specific threshold values. Furthermore, disclosed technology provides for single-click activation of suggested actions at scale directed at once to all device units within one or more device groups reported in critical state. In this way the proposed technology enables rapid restoration of a network state. Offending device(s) may then be easily identified, from device units within the device category isolated in a resolution space, and managed according to one or more device-specific actionable alerts automatically generated on the offending device.

20 Claims, 8 Drawing Sheets

(56) References Cited

U.S. PATENT DOCUMENTS

2016/0364553 A1* 12/2016 Smith .................. H04L 63/0435
2017/0251013 A1*  8/2017 Kirti ................... H04L 63/1441
2018/0247515 A1*  8/2018 Brady .................... G08B 29/10

OTHER PUBLICATIONS

"Network Device Vulnerability Checks," GFI LandGaurd, www.gfi.com, accessed on Sep. 18, 2018, pp. 1-2.
Nienhuis et al., "Real-Time IoT Device Monitoring with Kinesis Data Analytics," s3.amazonaws.com, May 2018, pp. 1-19.
Knowles, "IBM IoT Real-Time Insights-Anayltics Design for the Internet of Things," www.ibm.com, Sep. 3, 2015, pp. 1-8.

* cited by examiner

DYNAMIC ACTION DASHLET FOR REAL-TIME SYSTEMS OPERATION MANAGEMENT

TECHNICAL FIELD

The present technology pertains to systems and methods for real time network monitoring and management of on-boarded devices. More specifically it is directed to a real-time management of Internet of Things (IoT) based devices on data networks.

BACKGROUND

Traditionally, network applications have dashboards consisting of individual dashlets that display different summary metrics on a set of network devices. These metrics generally reflect overall system health and state of devices on the network. In real-time networks and wireless networks these dashlets can display information that indicates out of tolerance values. In particular, the dashlets can display out of tolerance values that require human operator action on many objects, e.g. IoT devices, in the network contributing to the out of tolerance measurements.

BRIEF DESCRIPTION OF THE DRAWINGS

In order to describe the manner in which the advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed are systems, methods, and computer-readable media for a monitoring and management of IoT devices in data networks system via a single dashboard featuring interactive alarm indicators and automatic generation of actionable alerts in response to programmable triggers to thereby aid network operator quickly initiate corrective actions for facilitating the on-boarding and control of IoT devices on data networks.

In some embodiments of the present technology, an IoT management system can measure operational performance of one or more Internet of Things ("IoT") devices in a network, and can present a representation of the one or more selected operational performance metrics associated with one or more IoT devices in the network in a graphical user interface. The IoT management system can compare the operational performance of the one or more IoT devices in the network to one or more threshold operational performance metrics of the one or more IoT devices, and can present an actionable alert for controlling operation of the one or more IoT devices in the network based on a comparison of the operational performance of the one or more IoT devices to the one or more threshold operational performance metrics. The actionable alert is presented as part of the representation of the operational performance of the one or more IoT devices.

Some embodiments of the technology, include one or more processors and at least one computer-readable storage medium with stored instructions, which when executed by the one or more processors cause the one or more processors to dynamically measure, one or more operational values for a selected set of performance metrics associated with one or more Internet of Things (IoT) devices in a network. The one or more processors may further present, a graphical user interface including a visual representation of the measured operational performance metrics for the one or more IoT devices. The one or more processors can also compare the measured values of the selected operational performance metrics with user and/or system defined threshold values for each of the operational performance metrics, and present an actionable alert for controlling operation of the one or more IoT devices in the network (or similarly guiding user and/or system initiated corrective actions aimed at restoring the state) along with the real-time representation of selected operational performance metrics. The alert may be based on a comparison of the dynamically measured values of the selected operational performance metrics for the one or more IoT devices, to the one or more system and/or user defined threshold values for the one or more selected operational performance metrics.

DETAILED DESCRIPTION

It may often be the case that the human operators need to act almost immediately based on observed out of tolerance network conditions (e.g., in order to secure the network). This is problematic with respect to Internet of Things (IoT) devices, where a large number of IoT devices may contribute to the out of tolerance condition. When an out of tolerance condition exists, human operators need to take actions on a large number of IoT devices, in order to secure the network. Therefore, there is a need for systems, methods, and computer-readable mediums capable of generating representations of IoT device performance to a human operator in a quickly perceivable manner. Further, there exist a need for systems, methods, and computer-readable mediums capable of providing actionable alerts to human operators that facilitate quick control of IoT devices, (i.e., act on a large number of IoT devices simultaneously), in order to quickly secure a network.

Existing Dashboard technologies utilized, for example in analytics-based applications, are primarily monitoring and surveillance tools with little to no interactive functionality. The extent of user/operator interaction offered in these products is typically confined to enabling users/operators to drill down to more detailed views. Existing technologies do not provide for identifying and automatically generating corrective actions based on the real-time network/device measurements reported on the dashboard. Furthermore, current system operation and management systems do not provide features that enable users to take effective actions directly through the dashboard interface itself. The forgoing deficiencies are overcome by embodiments of the present disclosure directed to a system and method for real-time management of IoT devices featuring a dynamic action dashboard with interactive visual alarm indicators that allow an operator, upon a visual observation of a fault condition in the network, to directly interact with the visual representation of the out of tolerance performance attribute. In some embodiments, this may be accomplished by way of one or more actionable alerts generated on the visual alarm representation.

In some embodiments of the present technology, systems, methods, and computer-readable mediums can quickly assess and subsequently control operation of IoT devices in a network. Specifically, some embodiments of the present technology include, systems, methods, and computer-readable mediums for presenting actionable alerts to human operators to control operation of IoT devices in a network for the purpose of securing the network and/or recovering from a network fault condition or unusual traffic behavior. In some embodiments, several operational performance attributes of one or more IoT devices in a network are measured to set up a base-line profile for the said performance attributes.

In some embodiments, the present technology includes a visual representation of the real-time operational performance of the one or more IoT device in the network to be presented through a graphical user interface to a network operator and/or user. Real-time operational performance for the IoT devices in the network may then be compared to a pre-defined threshold value related to the performance attribute being monitored. Pre-defined threshold values may be determined based on the measured base-line performance profile of one or more IoT devices. Subsequently, one or more actionable alerts for controlling operation of the one or more IoT devices in the network may be presented on the visual representation of the operational performance of the IoT devices. Triggering of the actionable alerts may be based on a comparison of the operational performance of the one or more IoT devices to the one or more threshold values related to the operational performance metric being measured. The actionable alerts may be presented directly on the visual representation of fault condition and be applicable at once to all devices under the fault condition.

In some embodiments, the present technology includes a mobile dashboard view comprised of many dashlets that may be utilized to display summary statistics of one or more relevant performance metrics associated with connected devices such as about the IoT devices. The performance of the network may be evaluated on the basis of various criteria. The presence of an alarm condition along with relevant information such as the extent and severity of the alarmed state may be communicated to the user using, for example, a numerical score or a color scheme, as well as other mechanisms. In some embodiments, the present technology includes a connection score in the form of a numerical rating of, say, 1 to 10, which may be used to effectively characterize a strength of network connection (i.e., a score of 1 may signify a connection loss, while a score of 10 may represent a fully connected and operational state with good performance attributes such as high Received Signal Strength or Signal to Noise Ratio and no loss.) Similarly a Security score may be used to characterize the level of network security available on an on-boarded device. A Security score may be presented as a numerical rating of, say, 1 to 10 (i.e., a score of 1 may signify a compromised or unsecure state, while a score of 10 may represent a connected state with strong authentication and encryption, and exhibiting expected traffic pattern.)

An IoT management system may monitor, diagnose and generate actionable alerts with regards to various network performance aspects on on-boarded IoT devices, such as the Upload bandwidth utilization pattern or upstream data transfer rates (i.e., number of byte per second). Another performance criteria or metric of interest maybe a Download bandwidth utilization pattern corresponding to the rate of data transfer (i.e., number of bytes per second) transferred to the device or received by the device in a downstream direction.

In some embodiments of the present technology, network state and/or activity may be monitored in accordance to one or more performance criteria. For example, a controller or service can dynamically measure one or more performance attributes and compare measurements against one or more reference threshold values appropriate to each measured performance attribute. Selected performance attributes may include metrics such as security strength, connection quality, unusual traffic pattern and activity, upload/download bandwidth, processing overhead, and/or any other measures of performance relevant to a network operator/administrator or user. As such, the system may generate and display across a user interface (i.e., directly on the dashlet graph) one or more actionable alerts depending on the type of fault condition detected, particular device categories(s) affected, and/or number or percentage of device units affected. The actionable alert may be triggered automatically when one or more measured performance attributes (i.e., connectivity score, security scores, etc.) exceed one or more user/operator/system defined threshold values for a specific number or percentage of devices. In accordance with some embodiments of the present technology the actionable alerts may appear directly on the user interface view or dashlet graph and may be specific to the device group implicated and type of deviation recorded.

According to some embodiments, a rule or rules may be set up for one or more performance metrics of relevance to a network operator and/or user. A rule may define one or more threshold levels such that if thresholds levels are reached or exceeded for a specific number or percentage of devices then one or more actionable alerts may appear directly on the dashlet graph. The actionable alert may be specific to the device group that has met the corresponding rule-based performance condition, and specific to the selected performance metric for which a deviation from the norm is recorded.

For example, a rule may instruct the system to generate actionable alerts to throttle bandwidth or perform a quarantine operation on all network connected camera units if, say, 90% of network connected camera units are exhibiting out of tolerance behavior in excess of a predefined threshold limits (i.e., reported error counts recorded within a specific time interval exceeding a pre-defined error count limit). The operation associated with the actionable alert (i.e., quarantine or throttle bandwidth) may be applied to all device units in the reported device category at once. In this way a faulty or alarmed network state may rapidly be brought under control. Subsequently, a software service may automatically direct the network operator to a resolution space wherein all the quarantine devices are transferred. In some embodiments, a resolution space may correspond to a customized space configured to isolate alarmed devices from the rest of the network and provide necessary troubleshooting tools and amenities to facilitate a quick resolution. Once in the resolution space, a network operator may easily identify and appropriately manage the individual device units responsible for the alarm condition within the one or more reported device groups.

In some embodiments of the present technology, a quick action dashlet is proposed for dynamically assessing network behavior of one or more on-boarded IoT devices and for displaying one or more executable alerts with corresponding corrective action options in response to a one or more performance metrics exceeding one or more threshold values. In some embodiments, rule(s) for generating an actionable alert may correspond to any deviation from an expected traffic pattern/behavior associated with one or more on-boarded IoT devices, or with one or more groups or categories of on-boarded IoT devices.

The one or more actionable alerts are formulated and displayed dynamically (in real-time) based on the operator or user defined thresholds that may be specific to one or more performance metrics associated with particular device categories or individual device units. In some embodiments of the technology, grouping or classifying connected devices may be implemented in accordance with any desired criteria such as functionality/location/operational condition, etc.)

Figure 1:
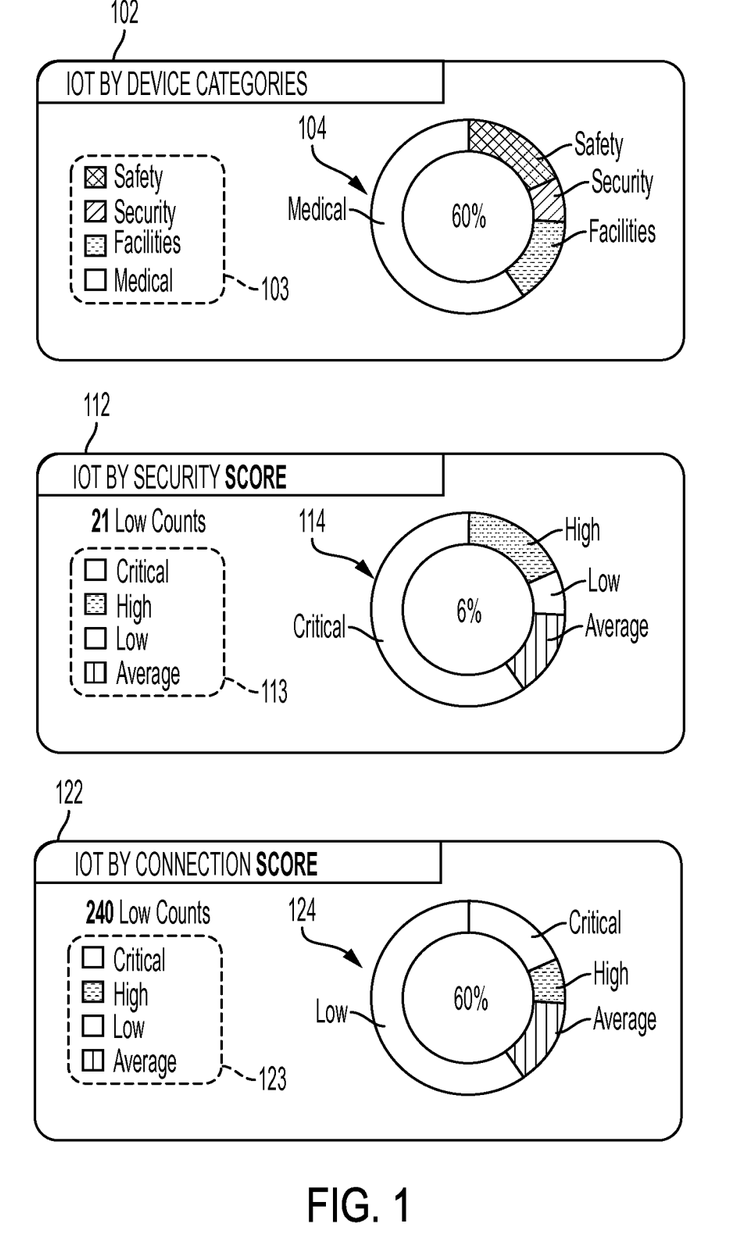
FIG. 1 illustrates an example dashboard view showing inventory of on-boarded device categories along with a security and connectivity assessment dashlets for the on-boarded device categories, in accordance to some embodiments of the present technology.

FIG. 1 illustrates an example dashlet view 102 comprising an index of device categories 103 and a doughnut chart 104 showing an inventory breakdown of on-boarded IoT devices based on different device categories. For example, the doughnut chart 104 is comprised of color-coded segments 105, 106, 108 and 110 corresponding to on-boarded Safety, Security, Facilities and Medical device categories. As such, each segment of the doughnut chart 104 is associated with a different device category from index 102. Moreover the relative size of each segments of the doughnut chart 104 serves as a visual representation of the relative device count (or the number of on-boarded units) in each device category.

In the example of FIG. 1, an IoT management service receives, through dashboard interface 102, a single-action (i.e., single mouse click) user input directed to the medical device portion of the donut chart 104 and generates information, for example, about a percentage of network devices belonging to the selected category (i.e., Medical devices, as illustrated in the example of FIG. 1, comprise 60% of all on-boarded devices). Moreover, in response to additional user inputs (i.e., by double clicking on a segment of the doughnut chart associated with a particular device category) IoT management system, may generate a more detailed inventory breakdown of various on-boarded device types for the selected device category as further illustrated and described in reference to FIG. 2.

In some embodiments, IoT management system may assess and report on an out of tolerance behavior of an IoT device (i.e., an IV pumps or a fire alarm), for any of the one or more operator selected performance metrics (i.e., strength of a device security profile or network connection). According to some embodiments, an assessment of the out of tolerance device behavior may be based on an extent of observed deviation, in the selected performance metric, from a baseline or average activity level. For example, a 70%, 50%, 25% and 10% deviation from base-line level may respectively correspond to a critical, high, low and normal operational state or performance level. Furthermore, an IoT management system, as described by some embodiments of the present technology, may assess and report on an out of tolerance condition of one or more device type (i.e., all IV units or all fire alarms) or device category (all medical devices or all safety related devices) based on a relative count or percentage of IoT device units, of a particular type or category, that are exhibiting behavior outside of network operator prescribed limits.

Returning back to FIG. 1, an IoT management service, may be configured to generate different dashlet views for monitoring and managing network-related behavior and operating conditions of the one or more on-boarded IoT devices in accordance to various operator-selected performance metrics. Performance metrics may include attributes such as connection quality, security profile strength, upload bandwidth utilization or any other performance criteria of relevance to a network operator and/or user. In the example shown in FIG. 1, an IoT management system, in response to selection input form a user, performs a security level assessment on the on-boarded device categories (identified by index 103) and provides the results (i.e., security states associated with different IoT device categories) via doughnut chart 114 in Dashlet view 112. Various segments of doughnut chart 114, each of which represents a different device categories, are further associated with a security performance level as identified, for example, by the color of the different segments. Dashlet view 112 further comprise an Index 113 for providing a color key for different color-coded severity levels associated with the out of tolerance conditions (IoT device security profile strength) reported for different IoT device categories.

As described, in accordance to embodiments of the present technology, an IoT management system may assess and report on a plurality of performance aspects associated with on-boarded IoT devices. For example, dashlet 122 in FIG. 1 corresponds to a scenario wherein a IoT management service receives a user selection input corresponding to network connection performance. Accordingly, the IoT management service performs a network connectivity assessment for the on-boarded device categories (identified by index 103) and illustrates the results (i.e., network connection score associated with different IoT device categories) via doughnut chart 124 in Dashlet view 122. Dashlet view 122 further comprise an Index 123 for providing a color key for different color-coded severity levels associated with the out of tolerance conditions (IoT device network connection/connectivity quality) reported for different IoT device categories.

In accordance to some embodiments of the present technology, a strength of a security profile associated with different on-boarded IoT devices may be assessed based on a security score assigned to each IoT device by the IoT management service. The assigned security scores may be reflective of, for example, the number of active security features available on the device and/or the observed device activity pattern.

In the embodiments illustrated in FIG. 1, the assessment and reporting of the security performance (dashlet 112) and network connectivity performance (dashlet 122) of the on-boarded IoT devices were performed at a device category level and in connection with the inventory breakdown results in dashlet 102. However, features of the technology enable a network operator to monitor, assess and control the real-time condition and dynamic behavior of the network at varying degrees of granularity. For example, a network IoT management system, as described in accordance to some embodiments of the present technology, provides a functionality for drilling down to more detaned inventory breakdown views. For example, device categories indicated by index 103 in FIG. 1 may be broken down further on a basis of different device types within each device category as illustrated in FIG. 2.

Figure 2:
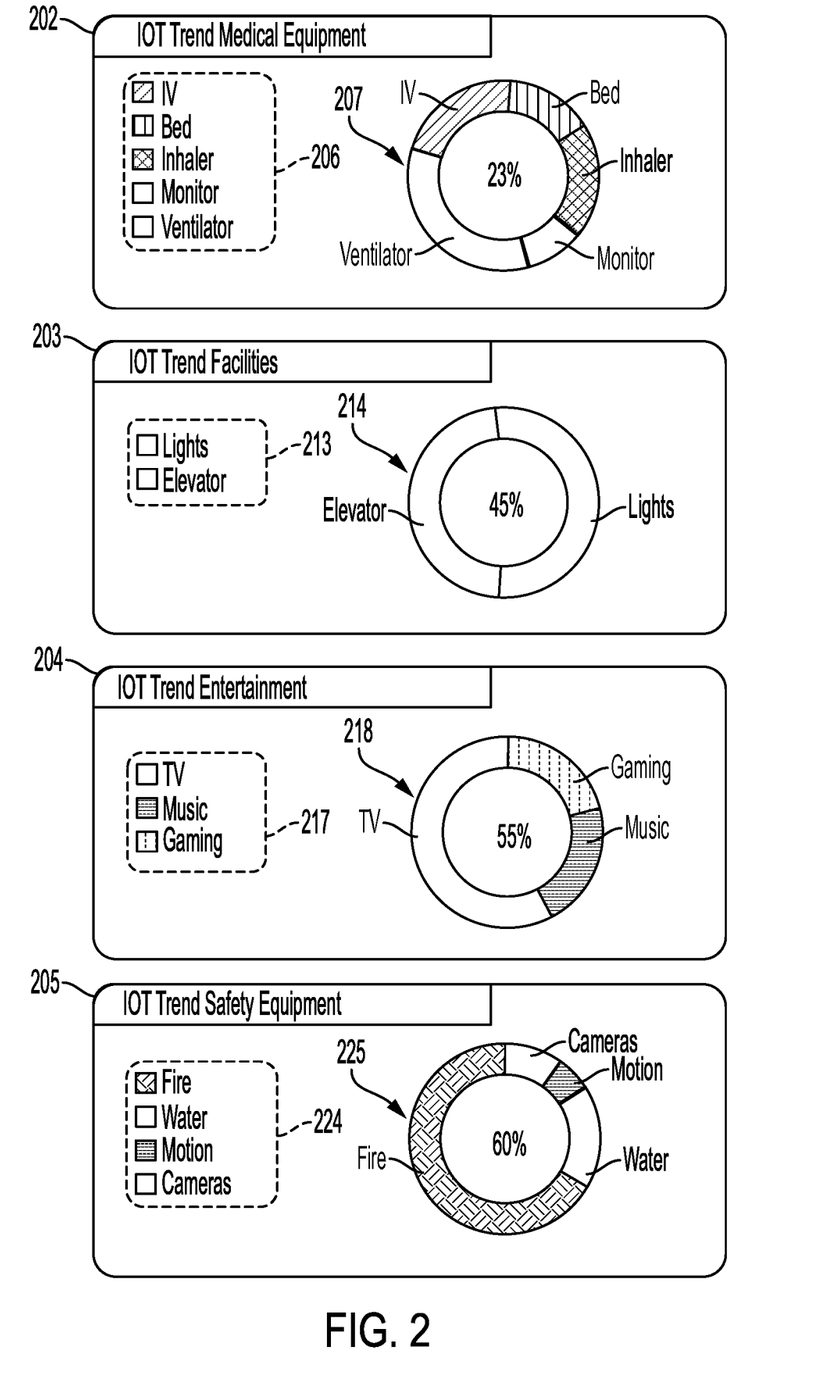
FIG. 2 illustrate an inventory breakdown of on-boarded device categories on the basis of constituent device types for each device category, in accordance to some embodiments of the present technology.

With reference to FIG. 2, Dashlets 202, 203, 204 and 205 provide an inventory breakdown of various device types belonging, respectively, to medical, facilities, entertainment and safety related device categories (identified by index 103 in FIG. 1.) Dashlet view 202 comprises an index 206 identifying different on-boarded medical device types along with a doughnut chart 207 showing a type-based inventory breakdown of the indexed medical device types. Dashlet view 203 comprises an index 213 identifying different on-boarded facilities-related device types along with a doughnut chart 214 showing a type-based inventory breakdown of the indexed facilities related device. Dashlet view 204 comprises an index 218 identifying different on-boarded entertainment-related device types along with a doughnut chart 218 showing a type-based inventory breakdown of the on-boarded entertainment-related devices. Dashlet view 205 comprises an index 225 identifying different on-boarded safety-related device types along with a doughnut chart 225 showing a type-based inventory breakdown of the on-boarded safety-related device.

Doughnut charts 202-205 in FIG. 2 are comprised of color-coded segments each of which is associated with a different device type from the corresponding index. Moreover the relative size of each segments of the doughnut charts serves as a visual representation of the relative device count (or the number of on-boarded units of each device type as a percentage of total number of on-boarded devices in the associated device category) for each device type. An integrated IoT management service, in accordance to some embodiments, may provide additional details corresponding to a device type and/or category, in response to a user input directed to a corresponding portion of the associated doughnut chart. Referring back to the example of FIG. 2, the IoT management service provides a numerical representation of relative count for different device types, in response to a single-action user input (a mouse click) directed to a corresponding portion of the doughnut. User input may be entered directly via the dashlets. For example on-boarded IV devices, with reference to doughnut chart 207 of dashlet 202, comprise 23% of all on-boarded medical equipment, on-boarded Elevator controller, with reference to doughnut chart 214 of dashlet 203, comprise 45% of all on-boarded facilities-related devices, on-boarded TV-related devices, with reference to doughnut chart 218 of dashlet 204, comprise 55% of all on-boarded entertainment-related devices, and on-boarded fire alarms, with reference to doughnut chart 225 of dashlet 205, comprise 60% of all on-boarded medical equipment.

According to some embodiments of the present technology, threshold-based identification of abnormal or out of tolerance network conditions of varying severity levels may be expressed as a set of rules. Rules may be specific for a particular performance metric, and may be triggered based on a degree of deviation of selected performance metric(s) from a reference threshold value or range. In some embodiments, one or more rules may be triggered based on a pre-defined percentage of the devices in a certain device category and/or type exceeding a safe operational threshold as indicated by a network operator or user. For example, a condition corresponding to 70% of device unit in a certain IoT device category/type exhibiting a deviation from a base-line activity level in excess of a prescribed threshold value or range may trigger the IoT management service to generate and display a critical status on the aforementioned device category/type. Rules may also be triggered based on a degree of deviation of one or more performance metric from a base-line level. For example, a 70% deviation from base-line activity level may generate a critical alert on a device units of a specific type or category exhibiting the observed abnormal activity levels.

In accordance to some embodiments of the present technology, an IoT management service may surface, in response to a reported out of tolerance condition exceeding a prescribed severity threshold (as defined by one or more pre-defined rules), one or more actionable alerts directly on a portion of a device chart on which the out of tolerance condition is reported. The actionable alerts may be directed to out of tolerance network conditions pertaining to one or more operator-defined grouping of on-boarded IoT devices, a user-selected IoT device category, a specific device type within a device category or individual device units. Common actions maybe to limit the allocated bandwidth or quarantine large sets of devices associated with the out of tolerance network condition. The action(s) may be applicable to multiple devices of a certain type, all the units belonging to a device type and/or device category, operator-defined grouping of devices and/or individual device units.

As described in reference to FIGS. 1 and 2, the IoT management system enable the monitoring, assessment, reporting and management of various performance aspects and real-time network operating conditions of the on-boarded IoT devices at a various levels of granularity. For example in FIG. 1 two selected performance aspects, namely security profile strength and connection quality, were performed at device category level and in connection with the inventory breakdown results in dashlet 102. The functionality for drilling down to more detained inventory breakdown views was illustrated in FIG. 2.

Figure 3:
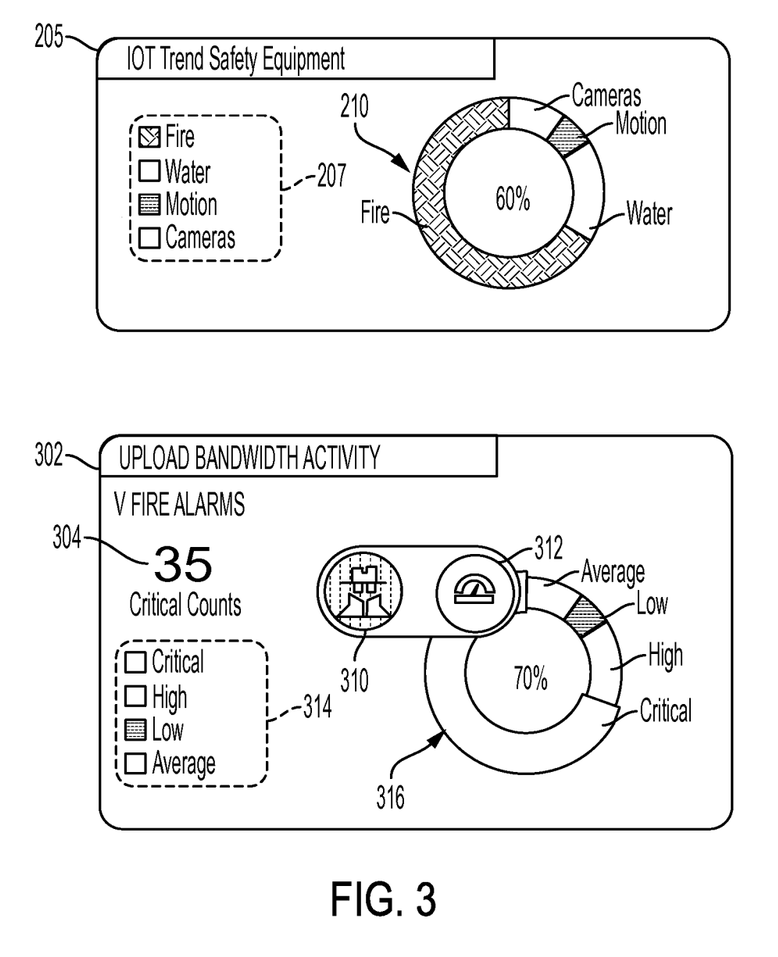
FIG. 3 illustrate a dashboard view for inventory breakdown of safety-related devices along with a dashlet for monitoring and managing an upload bandwidth activity of various safety device types, in accordance to some embodiments of the present technology.

In FIG. 3 dashlet 205 provides an inventory breakdown of various IoT safety device types in the safety-related device category is provided in FIG. 3. FIG. 3 in a separate panel provides a dashlet view 302 for monitoring and managing upload bandwidth activity of on-boarded safety-related IoT devices. Dashlet 302 comprise a doughnut chart 316 consisting of color coded segments for representing various severity levels of the upload bandwidth condition observed for on-boarded safety-related IoT device types and/or units (as indicated by Index 314).

In some embodiments of the present technology, a network alarm status or out of tolerance condition may be monitored, assessed and addressed directly from the dashlet views. This may be implemented via actionable alert indicia or icons that the IoT management system generates directly on a portion of a (doughnut) chart corresponding to the IoT devices exhibiting out of tolerance behavior. In some embodiments the actionable alert are surfaced by the IoT management system in response to a single-action input (i.e., a mouse click) from a network user or operator. In some embodiments the actionable alert may be surfaced automatically and proactively by the IoT management system when a pre-defined threshold for a selected out of tolerance condition is exceeded. For example, with regards to upload bandwidth utilization criteria, an actionable alerts rule may provide for an automatic triggering of actionable alerts in response to pre-defined percentage of devices exceeding a threshold upload rate in a 24 hour period. With reference to the example embodiment of FIG. 3, an actionable alert rule is set by a network operator for an actionable alert to automatically appear in response to 70% (or more) of on-boarded units associated with any of the safety device types in the safety device category (including fire alarms) exceeded (up or down) its average signal level by 70%. By nature, fire alarms do not move much, and their signal level is generally stable (accounting for standard variations of the Radio Frequency conditions). Therefore a performance deviation of 70% or more from baseline level may be considered as a critical situation by network operator requiring immediate action to restore the network state by, for example, immediately isolating faulty devices from the rest of the network for further troubleshooting. Moreover, the suggested actions, in accordance to some embodiments, may be implemented at scale and directly from the dashlet view. For example, the IoT management service/application, in response to a user input entered directly at the dashlet view, may apply a user-selected action to all safety-related device units or more granularly to all device units of type fire alarm in the safety-related device category. The alternative would be for a network operator to locate the network location of the critical devices and perform the quarantine action one by one for each device.

Referring back to FIG. 3, a dashlet view 302 for monitoring and managing upload traffic activity of on-boarded safety device units comprises a doughnut chart 303 showing a condition of upload bandwidth activity for on-boarded IoT safety devices based on four different severity levels corresponding to an average base-line activity along with 3 levels of signals deviations relative to the baseline (as indicated by Index 304). The indicator 305 reports 35 fire alarm units in a critical state. The critical activity level, corresponding, for example, to a 70% deviation from the base-line activity level, may be associated with one or more actionable alerts that appears on the appropriate segment of the doughnut chart 303 (i.e., the segment in critical state.). In case of the example shown in FIG. 3, the network management system generated two action options, corresponding to a quarantine operation performed on the affected devices (represented by actionable alert icon 310), or a throttle upload bandwidth operation performed on the affected devices (represented by actionable alert icon 312.) The selection may be initiated by a user-input entered directly via graphical user interface such as dashlet 302. As described, the network management system will apply the action(s), selected directly from the dashlet 302, to all of the devices represented in the section of the doughnut chart for which the actionable alert was generated In some embodiments, the presented actionable options may be removed from view once an admin executes the suggested action (by, for example, clicking on the appropriate icon). This capability is applicable both to large groups or subsets of networked IoT devices for which an actionable alert has been issued, as well as to individual device units in each device group. A quick response to many out of tolerance devices is essential to keeping modern wireless networks stable and operational. As IoT devices proliferate on wireless networks is more critical to summarize track, analyze, and act on many devices in a mass change or batch mode In some embodiments, a network management service/system, as described by some embodiments of the present technology, may conduct a profiling of on-boarded devices to determine respective base-line activity levels. Consequently the network management service determines a severity level (for example based on color coding) of a present alarm condition based on degree of deviation from base-line activity levels. Once the base-line is exceeded the condition is flagged in the network management application. Accordingly, network management application may generate one or more targeted actionable alerts when base-line activity levels are exceeded. In some embodiments a severity of an alarmed state (i.e., number of error counts) and/or a threshold for generation of actionable alerts by the system on a device category or device type, may be based on a number or percentage of respective device units exceeding or falling below a prescribed threshold.

In some embodiments, an actionable alert trigger or rule may correspond to detection of any abnormal performance or traffic conditions associated with on-boarded IoT devices. For example an actionable alert may be generated when a device category, a subset of a device category, or individual on-boarded IoT device units exceeds in either direction (up or down) its average signal level by certain amount or percentage (i.e., 70% deviation from normal activity level/pattern).

In some embodiments, the system automatically generates one more actionable alerts in response to one or more monitored/measured performance attributes moving outside a predefined tolerance limits as defined for that performance criteria by a network operator. Tolerance range for each of various performance attributes/metrics may be defined with one or more appropriately defined threshold values, against which the associated measured performance metric is compared. The automatically generated actionable alerts are directed to specific groups of devices and/or specific device units against which the actionable alert was generated.

Some embodiments of the present technology provide for a limited access user-level interface designated for operational staff and customized accordingly (i.e., Operational Technology view, may indicate degree of severity as a simplified signal level scale, similar to that of personal objects such as phones or tablets), provide for a full access network administrator-level interface designated for the Information Technology staff and customized accordingly (for an, for an Information Technology view, a scale in dBm may be used instead.)

Some embodiments of the present technology provide a user interface through which one or more actionable alert rules with regards to a set of target performance metrics of relevance (i.e., connection score, security score, upload bandwidth, download bandwidth, etc.) may be defined and inputted into the IoT management system by a network operator or user. The rules may be based on one or more threshold values or ranges that define a tolerance limit or acceptable range for each of the one or more operator-selected performance metrics. The rules may further involve one or more one or more action options, such that if corresponding thresholds are reached for a specific number or percentage of devices then the action option will appear directly on the dashlet graph, specific to the device group that has met conditions for the rule to trigger, and specific to the type of deviation recorded.

Figure 4:
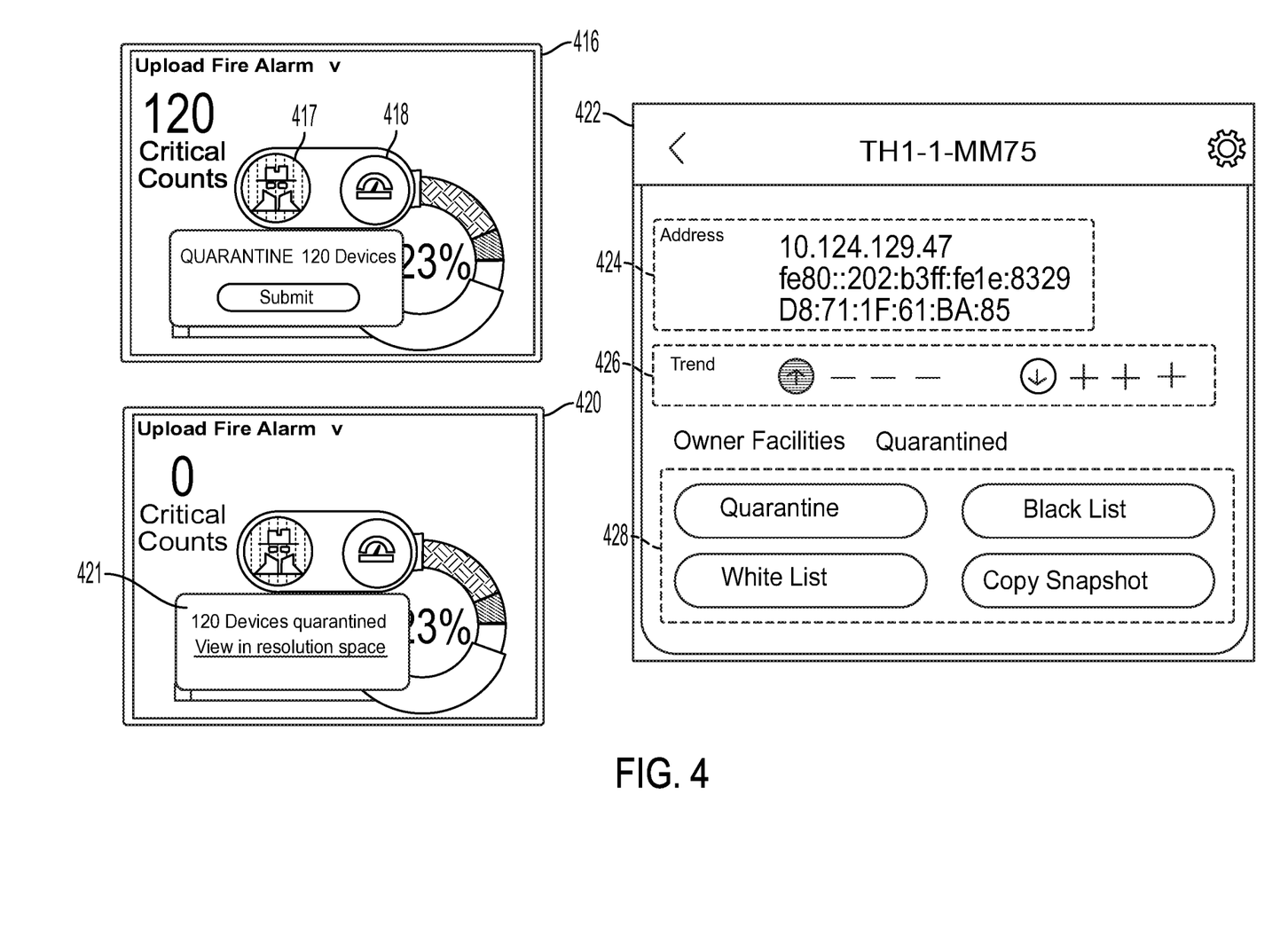
FIG. 4 illustrates a dashlet panel view featuring automatically generated actionable alert, corresponding to a quarantine operation, in accordance to some embodiments of the present technology.

In the example illustrated in FIG. 4, IoT system performs an assessment of the upload bandwidth activity/utilization pattern, according to a user performance-metric selection input, for on-boarded fire alarms, and reports, via dashlet 416, 120 fire alarm units in critical status. Critical alarm condition corresponding to unusual upload activity reported for fire alarm units may raise a security concern if the network-related behavior at issue is determined to be outside pre-defined threshold limits for specific device type/category. As such, IoT management system may automatically surface one or more actionable alerts, directly on the graphical alarm indication, in response to unusual behavior of one or more device categories and types crossing a one or more safety thresholds. For example, with reference to dashlet 416, the automatically generated actionable alert 417 corresponds to quarantine operation and actionable alert 418 corresponds to Bandwidth throttling action that may be applied to all device units within the one or more device categories or types represented by the critical status.

In example of FIG. 4 the one or more device types for which an actionable alert is generated may be quarantined or throttled immediately with a single-action user input from a network operator (i.e., single click of the mouse on an actionable alert icon generated by the IoT management system). For example, actionable alert representing quarantine action (417) may be applied at once against all Fire alarms exhibiting critical upload Bandwidth activity. Upon receiving an action selection input (i.e., quarantine action) from a network user/operator the IoT management system generates a confirmation message and provides access (i.e., with single click of the mouse) to the resolution space as shown by example panel 421 in dashlet view 420. A network operator can easily identify the offending device(s) from the quarantined devices in the resolution space view based on the device-specific performance trend indicators. Upon receiving a selection input from a network operator, identifying a specific device in the resolution space, the IoT management system generates a device specific dashlet 422. The device specific dashlet 422 comprises device address identifiers shown in panel 424, performance trend indication relative to baseline levels shown in panel 426 and set of corrective actions option (428) executable directly from the dashlet 422, wherein at this level the selected action is applied to a specific device identified by 424.

In some embodiments, the process may automatically move into resolution space upon completing a higher level action (i.e., quarantining one or more device categories on which critical state is reported.) The resolution space provides a summary display view for every device within the quarantined group. From the presented listing of the device(s) one or more offending devices (i.e., device units with disproportional contribution to the error count) may be easily identified and quickly isolated, throttled or subject to any other corrective action as configured in the system.

Figure 5:
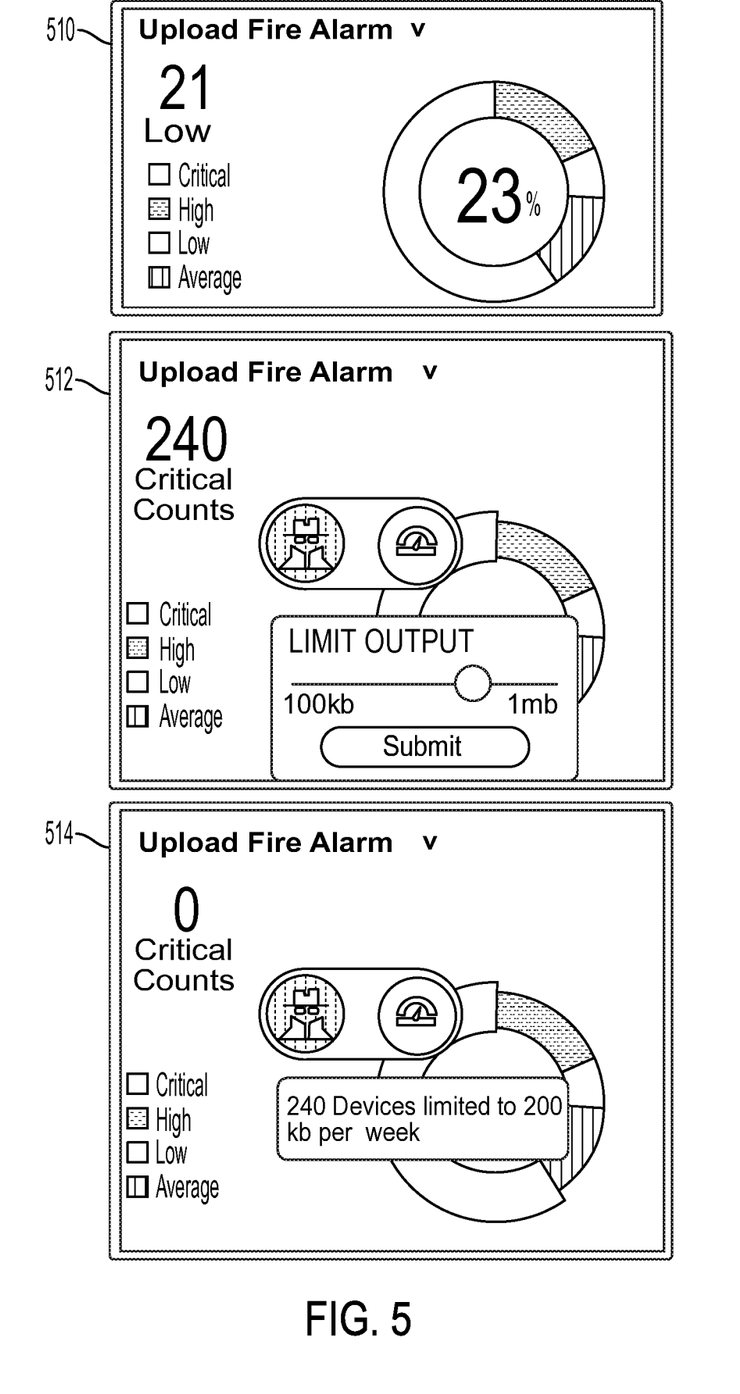
FIG. 5 illustrates dashlet panel featuring automatically generated actionable alert, corresponding to a bandwidth throttling operation, in accordance to some embodiments of the present technology.

Referring to FIG. 5, dashlet 510 represents an user interface, generated by the IoT management system, for monitoring and managing an upload bandwidth activity of on-boarded fire alarms. The IoT management system, in response to a single-action user input directed, for example, to the orange (indicating a low level alarm) segment of the doughnut chart in dashlet 510, may generate information regarding the number of fire alarm units (21 fire alarms) exhibiting a low severity upload bandwidth rate alert, corresponding for example, to an operator-defined percent deviation (23% deviation) from a base-line upload activity.

Dashlet 512 is generated by the IoT management system in response to receiving a user input corresponding to the selection of actionable alert 418 from dashlet 416. Actionable alert 418 corresponds to a rate limiting operation for throttling the upload bandwidth of all critical device units. As described, the selected action may be applied to all units (i.e., on-boarded devices) within a device category exhibiting out of tolerance performance levels.

Once the network administrator performs the recommended action then the associated alert may be removed from the panel view. In this way a quick response to many out of tolerance devices may be accomplished. This utility is essential to keep modern wireless networks stable and operational. As IoT devices proliferate on wireless networks is more critical to summarize track, analyze, and act on many devices in a mass change or batch mode.

Embodiments of the present technology enable Onboarding and management of IoT devices in a scalable way. Furthermore the onboarding process may be fully automated including the authentication (automatic pre-shared key generation) and classification of the device (i.e., based on type, function, etc.) For example, the IoT management system may automatically provide, to the scanned in devices, a pre-shared key for authentication when connecting to the network. Devices may be registered with a network database according to hardware address and the device specific pre-shared key which alternatively has to be provided by a network administrator who must send each student a pre-shared key for every device they would like on-boarded in their dormitory rooms.

Figure 6:
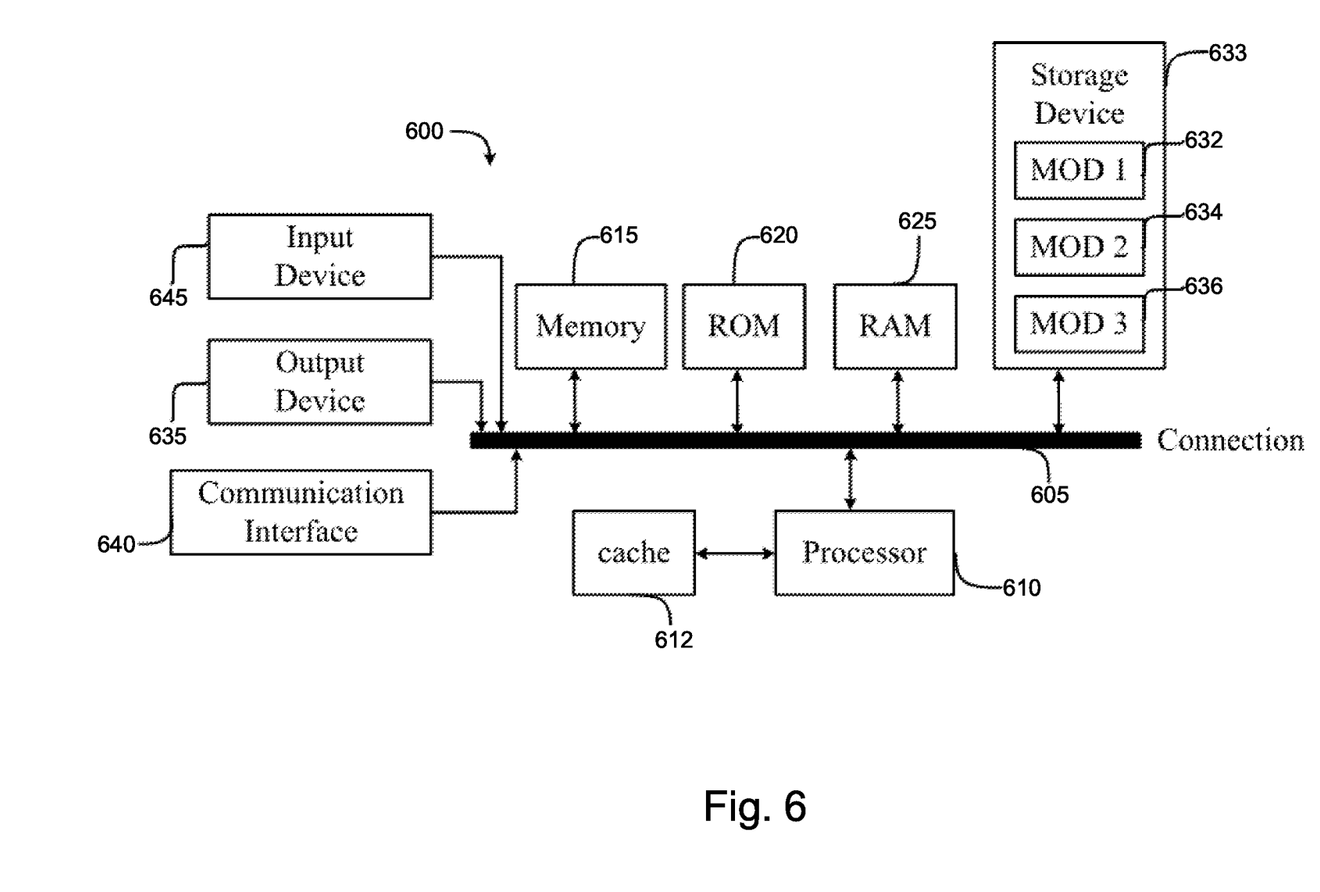
FIG. 6 illustrates an example network device in accordance to some embodiments of the present technology.
Figure 7:
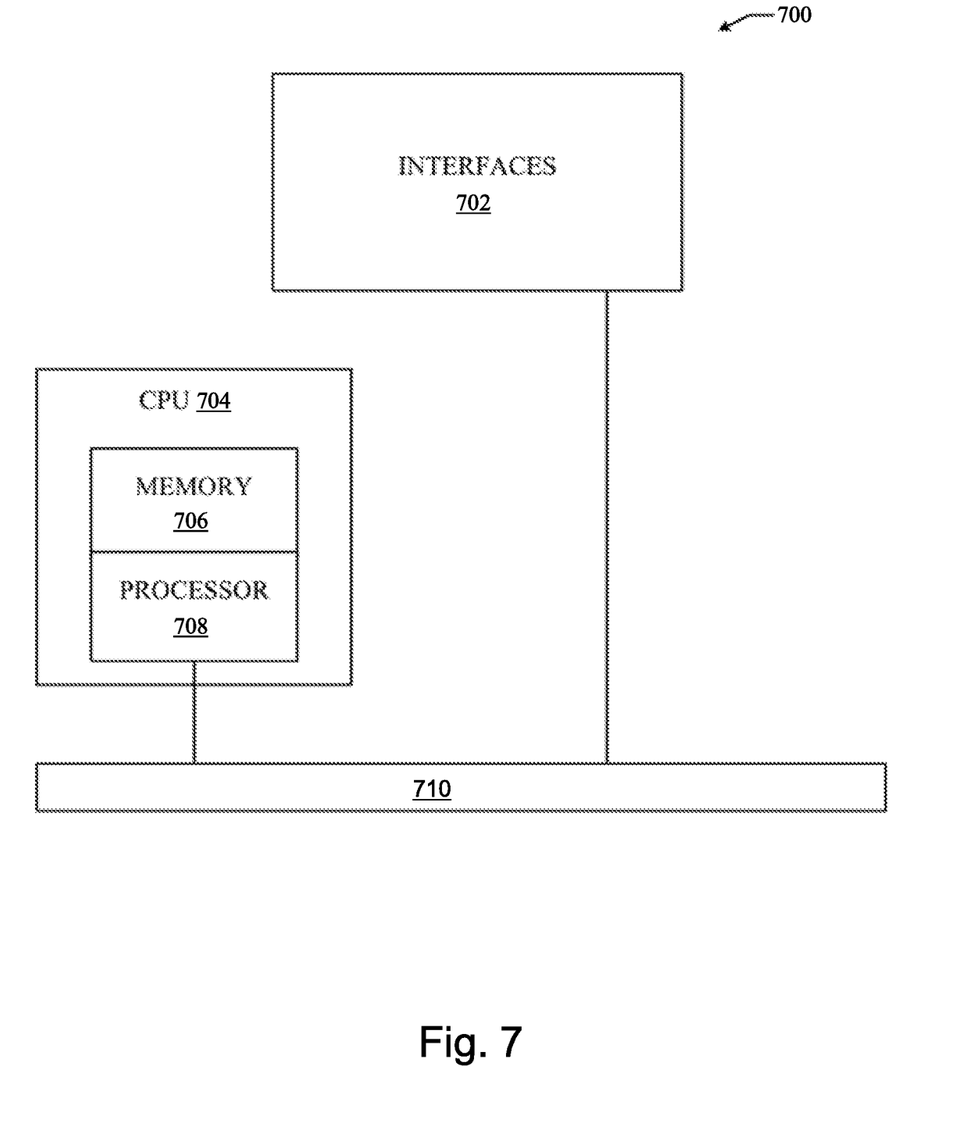
FIG. 7 illustrates an example architecture of a computing device, in accordance to some embodiments of the present technology.

The disclosure now turns to FIGS. 6 and 7, which illustrate example architectures of computing and network devices, such as client computers, switches, routers, controllers, servers, and so forth.

FIG. 6 illustrates a computing system architecture 600 including components in electrical communication with each other using a connection 605, such as a bus. System 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodel systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, assurance, and other networking operations. Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X106 family of microprocessors. In some cases, processor 708 can be specially designed hardware for controlling the operations of network device 700. In some cases, a memory 706 (e.g., non-volatile RAM, ROM, TCAM, etc.) also forms part of CPU 704. However, there are many different ways in which memory could be coupled to the system. In some cases, the network device 700 can include a memory and/or storage hardware, such as TCAM, separate from CPU 704. Such memory and/or storage hardware can be coupled with the network device 700 and its components via, for example, connection 710.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing, switching, and/or other operations. The ASIC can communicate with other components in the network device 700 via the connection 710, to exchange data and signals and coordinate various types of operations by the network device 700, such as routing, switching, and/or data storage operations, for example.

Figure 8:
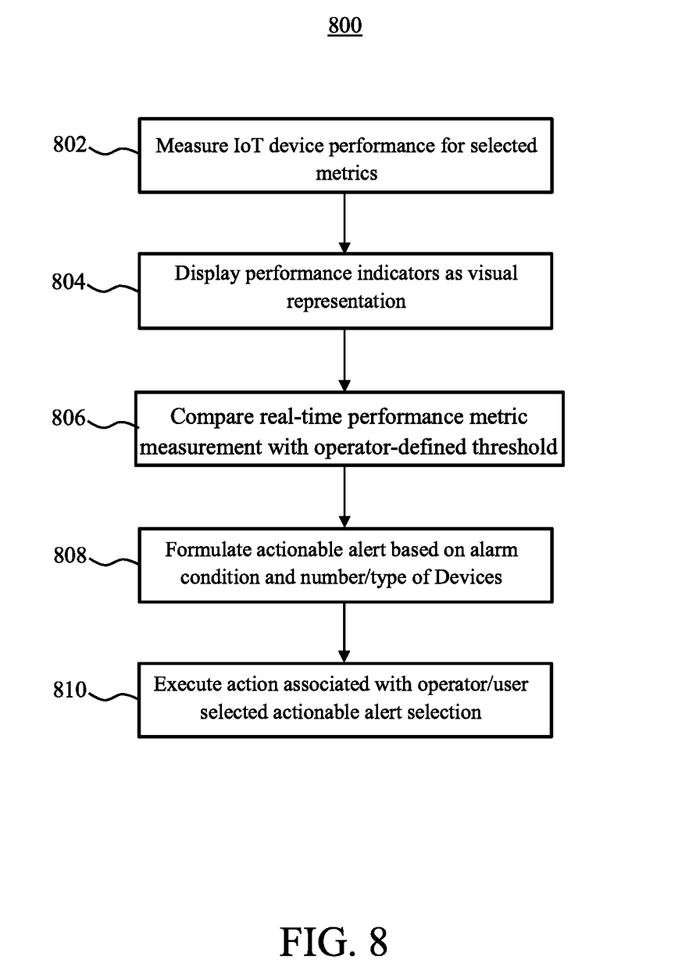
FIG. 8 illustrate an operational flow for an IoT management service featuring dynamic action dashlets, in accordance to some embodiments of the present technology.

FIG. 8 illustrates an example flow diagram for an IoT management process 800 featuring dynamic action dashlets. The IoT management process, at step 802, performs a real-time performance measurement, in accordance to one or more selected metrics, for one or more on-boarded IoT device. At step 804 the process 804 presents the measurement results in visually quantifiable way via one or more dynamic dashlets. The operation then moves to step 806 wherein the real-time performance measurements from step 802 are compared with pre-defined threshold values or ranges. If the measured performance attributes falls outside bounds defined by the threshold parameter, the process moves to step 808 wherein based on the nature of the alarm condition and the number and types of IoT devices involved, one or more actionable alerts are formulated for addressing the alarm condition. The actionable alerts are surfaced onto the visual alarm indications to facilitate a quick and easy selection by a network operator. Upon receiving an action-selection input from a network operator, the process moves to step 810 wherein the selected action is executed by the IoT management system.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    measuring operational performance of one or more Internet of Things ("IoT") devices in a network;
    presenting a plurality of representations of the operational performance of the one or more IoT devices in the network through a graphical user interface, wherein at least one of the plurality of representations includes displaying the operational performance of the one or more IoT devices by category and at least another of the plurality of representations includes displaying the operational performance of the one or more IoT devices by score;
    comparing the operational performance of the one or more IoT devices in the network to threshold operational performance metrics of the one or more IoT devices, the threshold operational performance metrics including a first threshold for generating an actionable alert and a second threshold for automatically triggering the actionable alert; and
    in response to the operational performance of one of the one or more IoT devices exceeding the first threshold, presenting, in at least one of the plurality of representations of the operational performance of the one or more IoT devices, the actionable alert for controlling operation of the one of the one or more IoT devices in the network, wherein the actionable alert includes at least two actions options.

2. The method of claim 1, further comprising:
identifying one or more connection scores for the one or more IoT devices based on strengths of one or more connections of the one or more IoT devices in the network;
presenting a representation of the one or more connection scores for the one or more IoT devices in the representation of the operational performance of the one or more IoT devices; and
presenting the actionable alert for controlling operation of the one or more IoT devices based on the one or more connection scores for the one or more IoT devices.

3. The method of claim 2, wherein the one or more connections of the one or more IoT devices in the network are one or more wireless network connections, and the one or more connection scores for the one or more IoT devices are identified based on a received signal strength indication of one or more signals transmitted over the one or more wireless network connections.

4. The method of claim 2, further comprising:
comparing the one or more connection scores for the one or more IoT devices to a threshold signal level in a signal level scale; and
presenting the actionable alert for controlling operation of the one or more IoT devices based on a comparison of the one or more connection scores to the threshold signal level in the signal level scale.

5. The method of claim 1, further comprising:
identifying one or more security scores for the one or more IoT devices;
presenting a representation of the one or more security scores for the one or more IoT devices in the representation of the operational performance of the one or more IoT devices; and
presenting the actionable alert for controlling operation of the one or more IoT devices based on the one or more security scores for the one or more IoT devices.

6. The method of claim 5, wherein the one or more security scores for the one or more IoT devices are identified based on one or a combination of authentications of the one or more IoT devices for the network, encryption of traffic transmitted to and from the one or more IoT devices over the network, and traffic patterns of the one or more IoT devices in operating within the network.

7. The method of claim 5, further comprising:
comparing the one or more security scores for the one or more IoT devices to a threshold security level in a security level scale; and
presenting the actionable alert for controlling operation of the one or more IoT devices based on a comparison of the one or more security scores to the threshold security level in the security level scale.

8. The method of claim 1, wherein the actionable alert is an actionable alert for securing the network based on the operation of the one or more IoT devices in the network.

9. The method of claim 1, wherein the actionable alert for controlling operation of the one or more IoT devices is an actionable alert for limiting network service access of the one or more IoT devices by limiting an amount of data the one or more IoT device can either or both send and receive in the network.

10. The method of claim 1, wherein the actionable alert for controlling operation of the one or more IoT devices is an actionable alert for placing the one or more IoT devices into one or more segmented spaces in the network.

11. The method of claim 1, wherein the actionable alert for controlling operation of the one or more IoT devices is an actionable alert for providing a user access to additional analytics of the one or more IoT devices in the network.

12. The method of claim 1, wherein the operational performance of the one or more IoT devices in the network is measured using one or more unique pre-shared keys assigned to and corresponding to each of the one or more IoT devices.

13. The method of claim 1, wherein the actionable alert for controlling operation of the one or more IoT devices is an actionable alert for controlling operation of a group of IoT devices in the network simultaneously.

14. The method of claim 1, wherein the actionable alert for controlling operation of the one or more IoT devices is automatically executed upon being selected by a network operator.

15. A system comprising:
one or more processors; and
at least one computer-readable storage medium having stored therein instructions which, when executed by the one or more processors, cause the one or more processors to perform operations comprising:
measuring operational performance of one or more Internet of Things ("IoT") devices in a network using one or more unique pre-shared keys assigned to and corresponding to each of the one or more IoT devices;
presenting a plurality of representations of the operational performance of the one or more IoT devices in the network through a graphical user interface, wherein at least one of the plurality of representations includes displaying the operational performance of the one or more IoT devices by category and at least another of the plurality of representations includes displaying the operational performance of the one or more IoT devices by score;
comparing the operational performance of the one or more IoT devices in the network to threshold operational performance metrics of the one or more IoT devices, the threshold operational performance metrics including a first threshold for generating an actionable alert and a second threshold for automatically triggering the actionable alert; and
in response to the operational performance of one of the one or more IoT devices exceeding the first threshold, presenting, in at least one of the plurality of representations of the operational performance of the one or more IoT devices, the actionable alert for controlling operation of the one of the one or more IoT devices in the network, wherein the actionable alert includes at least two actions options.

16. The system of claim 15, wherein the instructions which, when executed by the one or more processors, further cause the one or more processors to perform operations comprising:
identifying one or more connection scores for the one or more IoT devices based on strengths of one or more connections of the one or more IoT devices in the network;
presenting a representation of the one or more connection scores for the one or more IoT devices in the representation of the operational performance of the one or more IoT devices; and presenting the actionable alert for controlling operation of the one or more IoT devices based on the one or more connection scores for the one or more IoT devices.

17. The system of claim 15, wherein the instructions which, when executed by the one or more processors, further cause the one or more processors to perform operations comprising:
- identifying one or more security scores for the one or more IoT devices;
- presenting a representation of the one or more security scores for the one or more IoT devices in the representation of the operational performance of the one or more IoT devices; and
- presenting the actionable alert for controlling operation of the one or more IoT devices based on the one or more security scores for the one or more IoT devices.

18. A non-transitory computer-readable storage medium having stored therein instructions which, when executed by a processor, cause the processor to perform operations comprising:
- measuring operational performance of one or more Internet of Things ("IoT") devices in a network;
- presenting a plurality of representations of the operational performance of the one or more IoT devices in the network through a graphical user interface, wherein at least one of the plurality of representations includes displaying the operational performance of the one or more IoT devices by category and at least another of the plurality of representations includes displaying the operational performance of the one or more IoT devices by score;
- comparing the operational performance of the one or more IoT devices in the network to threshold operational performance metrics of the one or more IoT devices, the threshold operational performance metrics including a first threshold for generating an actionable alert and a second threshold for automatically triggering the actionable alert; and
- in response to the operational performance of one of the one or more IoT devices exceeding the first threshold, presenting, in at least one of the plurality of representations of the operational performance of the one or more IoT devices, the actionable alert for controlling operation of the one of the one or more IoT devices in the network to secure the network, wherein the actionable alert includes at least two actions options.

19. The non-transitory computer-readable storage medium of claim 18, wherein the actionable alert for controlling operation of the one or more IoT devices is an actionable alert for limiting network service access of the one or more IoT devices by limiting an amount of data the one or more IoT device can either or both send and receive in the network.

20. The non-transitory computer-readable storage medium of claim 18, wherein the actionable alert for controlling operation of the one or more IoT devices is an actionable alert for placing the one or more IoT devices into one or more segmented spaces in the network.

* * * * *